(12) United States Patent
Moon et al.

(10) Patent No.: US 7,702,339 B2
(45) Date of Patent: Apr. 20, 2010

(54) BASE STATION, MOBILE STATION AND RADIO NETWORK CONTROLLER

(75) Inventors: Sung Uk Moon, Yokosuka (JP); Takehiro Nakamura, Yokosuka (JP); Minami Ishii, Yokohama (JP); Shinji Ueda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 883 days.

(21) Appl. No.: 10/663,701

(22) Filed: Sep. 17, 2003

(65) Prior Publication Data

US 2004/0058666 A1    Mar. 25, 2004

(30) Foreign Application Priority Data

Sep. 19, 2002    (JP) .............................. 2002-274143
Nov. 5, 2002     (JP) .............................. 2002-321835

(51) Int. Cl.
*H04W 4/00*    (2009.01)
*H04B 7/00*    (2006.01)
*H04M 15/00*   (2006.01)

(52) U.S. Cl. ....................... 455/463; 455/518; 455/519; 379/133; 379/134

(58) Field of Classification Search ................. 455/463, 455/526, 13.3, 82, 553.1, 562.1, 575.7, 518, 455/519; 379/133, 134
See application file for complete search history.

(56) References Cited

U.S. PATENT DOCUMENTS

| | | | |
|---|---|---|---|
| 5,727,002 A | | 3/1998 | Miller et al. |
| 6,122,483 A | * | 9/2000 | Lo et al. ..................... 455/12.1 |
| 6,128,472 A | * | 10/2000 | Harel et al. ................. 340/7.21 |
| 6,434,396 B1 | * | 8/2002 | Rune .......................... 455/502 |
| 6,707,900 B1 | * | 3/2004 | Jellema et al. ......... 379/221.08 |
| 7,149,195 B2 | * | 12/2006 | Kall et al. .................... 370/328 |
| 7,292,529 B1 | * | 11/2007 | Basu et al. ................... 370/230 |

(Continued)

FOREIGN PATENT DOCUMENTS

JP    4-23525    1/1992

(Continued)

OTHER PUBLICATIONS

3rd Generation Partnership Project; Technical Specification Group Terminals; Technical Realization of Cell Broadcast Service (CBS) (Release 1999), 3GPP TS 23.041 V3.3.0, Oct. 2000, pp. 1-37.

(Continued)

*Primary Examiner*—Nay A Maung
*Assistant Examiner*—Andrew Wendell
(74) *Attorney, Agent, or Firm*—Oblon, Spivak, McClelland, Maier & Neustadt, L.L.P.

(57) ABSTRACT

The object of the present invention is to provide a base station 10, a mobile station 11 and a radio network controller 50 which can reduce the load on the radio network controller 50 during multicast communication. The base station 10 supporting multicast communication comprises a response signal relay 10b configured to transfer response signals transmitted from a plurality of mobile stations 11, 12, 21, 41, 42 to a radio network controller 50. The response signals respond to a control signal for a multicast group. The response signal relay 10b transfers only a predetermined number of response signals to the radio network controller 50. Any following response signals are retained.

2 Claims, 4 Drawing Sheets

U.S. PATENT DOCUMENTS

| | | | |
|---|---|---|---|
| 2002/0187795 A1* | 12/2002 | Jeong | 455/466 |
| 2003/0012195 A1* | 1/2003 | Ohkubo et al. | 370/390 |
| 2003/0022683 A1* | 1/2003 | Beckmann et al. | 455/518 |
| 2003/0039232 A1* | 2/2003 | Casati et al. | 370/337 |
| 2004/0264490 A1* | 12/2004 | Sarkkinen et al. | 370/432 |
| 2005/0053068 A1* | 3/2005 | Toth et al. | 370/390 |
| 2005/0054353 A1* | 3/2005 | Mademann | 455/458 |

FOREIGN PATENT DOCUMENTS

| | | |
|---|---|---|
| JP | 7-107032 | 4/1995 |
| JP | 11-177548 | 7/1999 |
| JP | 2000-115051 | 4/2000 |
| JP | 2001-313604 | 11/2001 |
| JP | 2002-124935 | 4/2002 |
| JP | 2004-112544 | 4/2004 |
| JP | 2004-168190 | 6/2004 |
| KR | 10-2001-0026037 | 4/2001 |
| WO | WO 01/65885 A1 * | 9/2001 |

OTHER PUBLICATIONS

3$^{rd}$ Generation Partnership Project; Technical Specification Group Radio Access Network; Broadcast/Multicast Control BMC (Release 1999), 3GPP TS 25.324 V3.3.0, Dec. 2000, pp. 1-23.

* cited by examiner

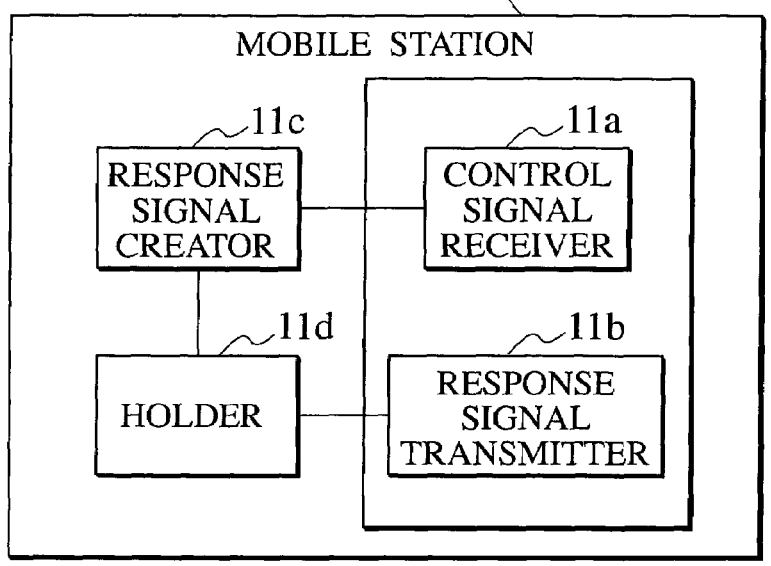
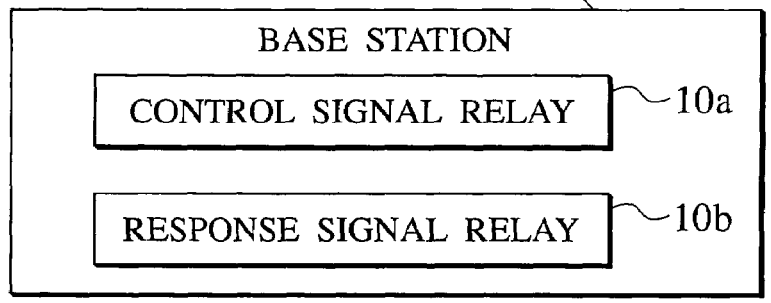
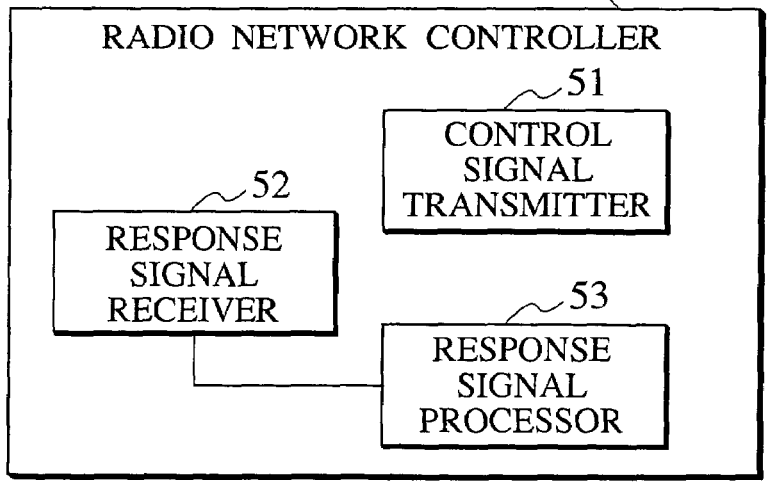

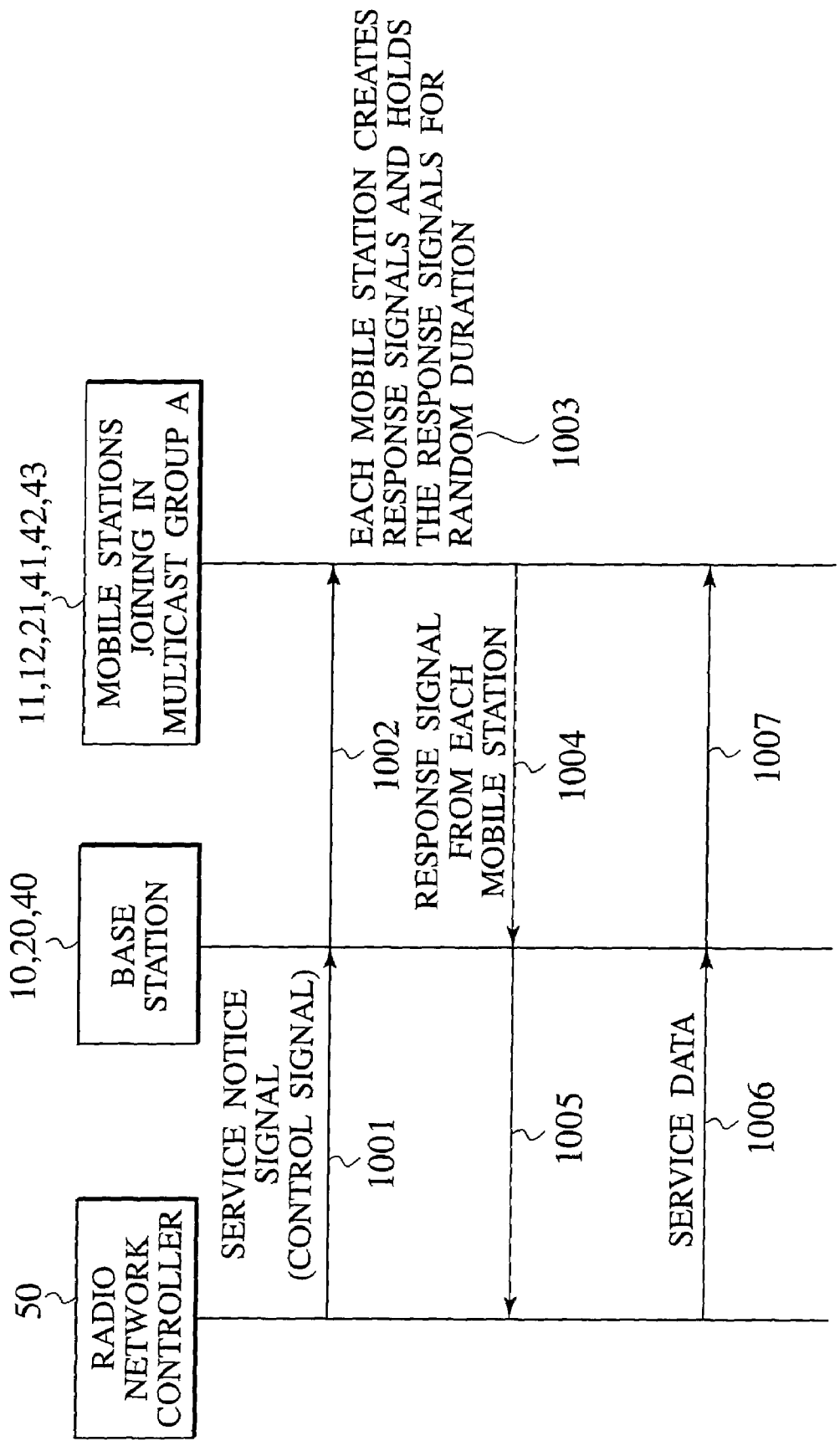

US 7,702,339 B2

BASE STATION, MOBILE STATION AND RADIO NETWORK CONTROLLER

CROSS REFERENCE TO RELATED APPLICATION

This application is based upon and claims the benefit of priority from the prior Japanese Patent Application No. P2002-274143, filed on Sep. 19, 2002; and P2002-321835, filed on Nov. 5, 2002; the entire contents of which are incorporated herein by reference.

BACKGROUND OF THE INVENTION

1. Field of the Invention

The present invention relates to a base station, a mobile station and a radio network controller which support multicast communication.

2. Description of the Related Art

As shown in FIG. 1, broadcast communication whereby a plurality of base stations 11 to 17 transmit common information to unspecified mobile stations 101 to 112 in predetermined areas is known in a conventional radio communication system.

As shown in FIG. 2, multicast communication whereby a plurality of base stations 1 to 17 transmit common information to specific mobile stations joining in (belonging to) a specific group is known in a conventional radio communication system.

However, there is a problem in that a plurality of mobile stations joining in a multicast group receive a controls signal for the multicast group at approximately the same time, and a plurality of response signals are transmitted to the radio network controller at approximately the same time, so that the load on receiving controlling and processing of the radio network controller is increased as the number of response signals increases in the conventional multicast communication.

BRIEF SUMMARY OF THE INVENTION

In viewing of the foregoing, it is an object of the present invention to provide a base station, a mobile station and a radio network controller which can reduce the load on the radio network controller during multicast communication.

A first aspect of the present invention is summarized as a base station supporting multicast communication. The base station comprises a response signal relay configured to transfer response signals transmitted from a plurality of mobile stations to a radio network controller. The response signals respond to a control signal for a multicast group. The response signal relay transfers only a predetermined number of response signals to the radio network controller. Any following response signal is retained. The predetermined number can be one.

A second aspect of the present invention is summarized as a mobile station supporting multicast communication. The base station comprises a response signal creator configured to create a response signal to a control signal for a multicast group; a response signal holder configured to hold the response signal for a predetermined duration; and a response signal transmitter configured to transmit the response signal to the base station after holding the response signal for the predetermined duration.

A third aspect of the present invention is summarized as a radio network controller supporting multicast communication. The radio network controller performs a predetermined processing on a predetermined number of response signals. The predetermined number of response signals respond to a control signal for a multicast group, and are transmitted from at least one first mobile station. The radio network controller performs processing on only the predetermined number of response signals. Any following response signals are unprocessed by the radio network controller. The following response signals are transmitted from at least one second mobile station. The predetermined number can be one.

BRIEF DESCRIPTION OF THE SEVERAL VIEWS OF THE DRAWINGS

FIG. 4 is a functional block diagram of a mobile station in the radio communication system according to the embodiment.

FIG. 5 is a functional block diagram of a base station in the radio communication system according to the embodiment.

FIG. 6 is a functional block diagram of a radio network controller in the radio communication system according to the embodiment.

FIG. 7 is a sequence diagram illustrating the operation of the radio communication system according to the embodiment.

DETAILED DESCRIPTION OF THE INVENTION

<A Configuration of a Radio Communication System According to an Embodiment of the Present Invention>

Figure 1:
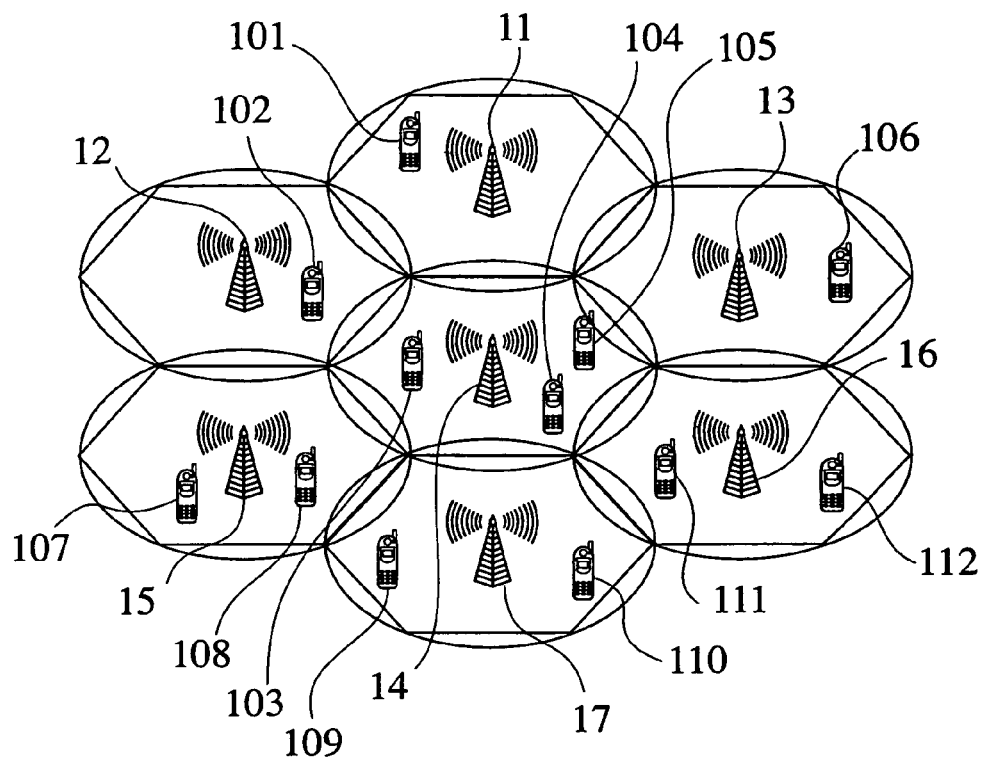
FIG. 1 is a diagram for explaining broadcast communication according to the prior art.
Figure 2:
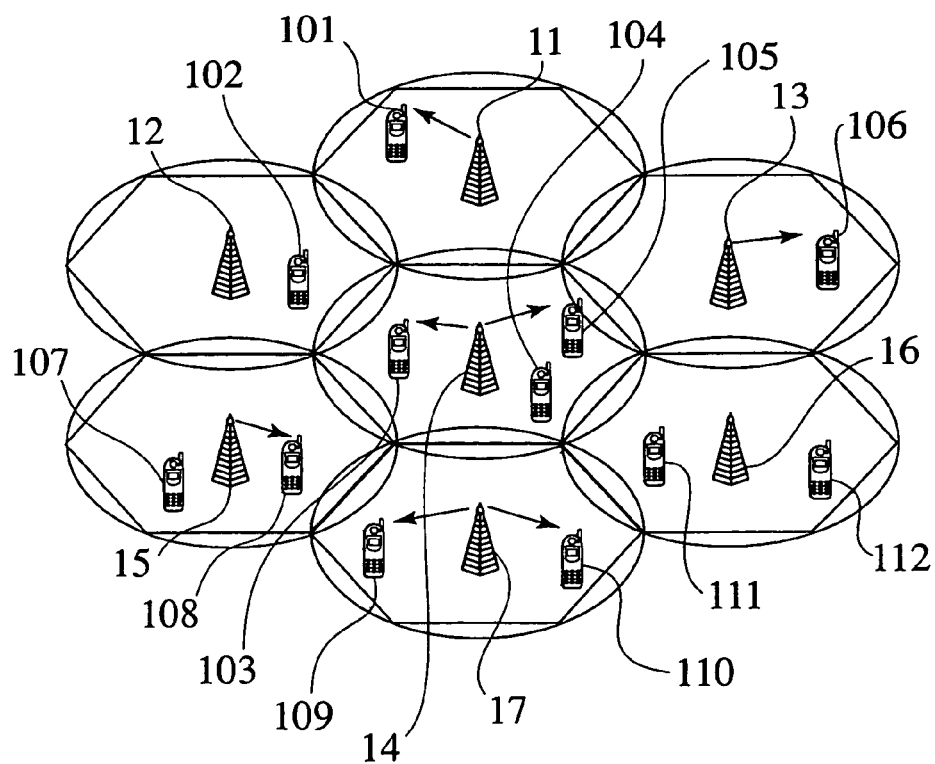
FIG. 2 is a diagram for explaining multicast communication according to the prior art.
Figure 3:
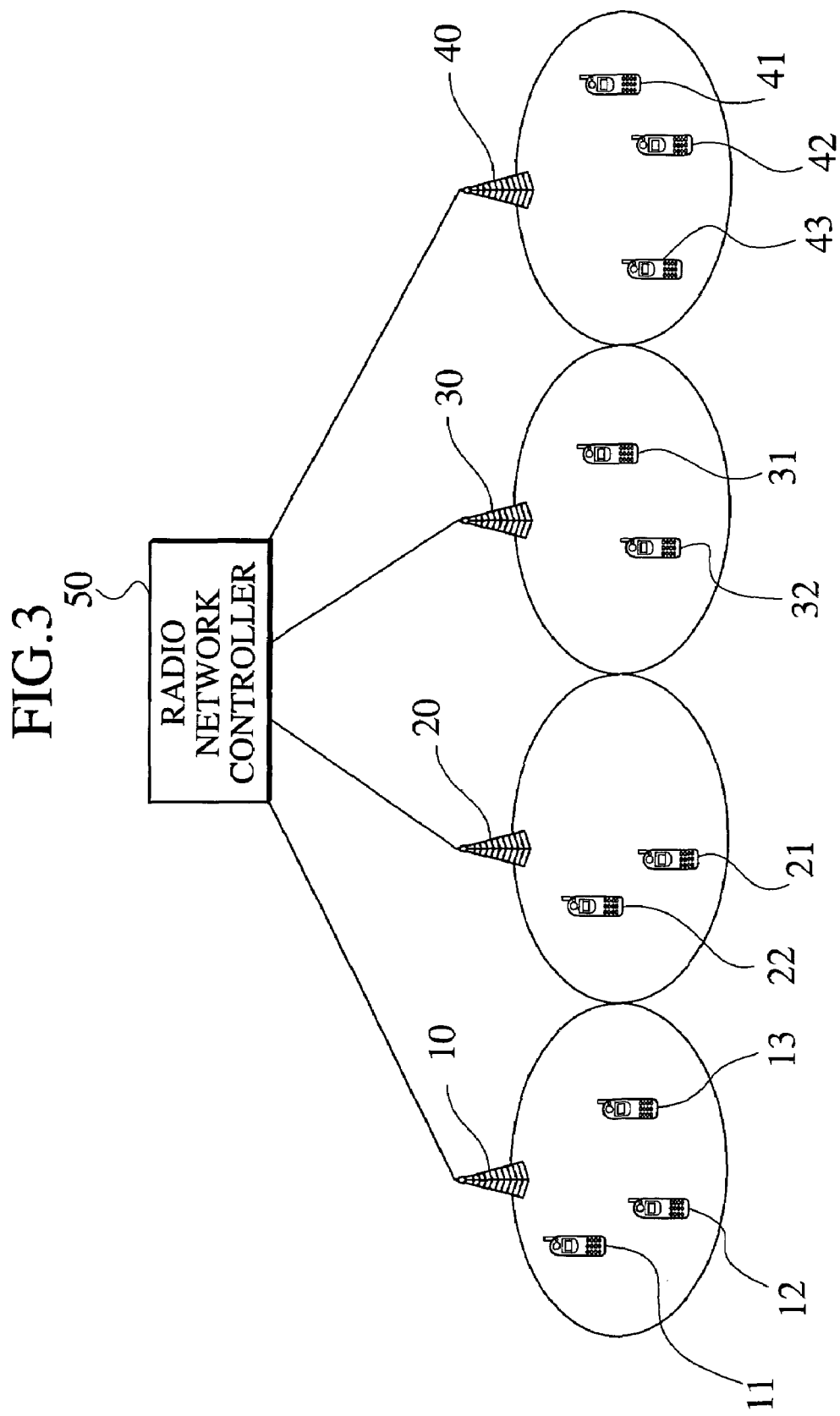
FIG. 3 is a diagram showing the entire configuration of a radio communication system according to one embodiment of the present invention.

FIG. 3 shows the entire configuration of a radio communication system according to an embodiment of the present invention.

As shown in FIG. 3, the radio communication system according to the embodiment comprises four base stations 10, 20, 30 and 40 under a radio network controller 50.

In the radio communication system according to the embodiment, the base station 10 manages mobile stations 11 to 13, the base station 20 manages mobile stations 21 and 22, the base station 30 manages mobile stations 31 and 32, and the base station 40 manages mobile stations 41 to 43. The mobile stations 11, 12, 21, 41, 42 and 43 join in the same multicast group A in the embodiment.

FIG. 4 shows a functional block diagram of the mobile station used in the radio communication system according to the embodiment. Functions of a plurality of mobile stations 11 to 43 are basically the same, so that the function of the mobile station 11 will be explained as follows.

As shown in FIG. 4, the mobile station 11 is configured with a control signal receiver 11a, a response signal transmitter 11b, a response signal creator 11c and a holder 11d. The mobile station 11 can support multicast communication.

The control signal receiver 11a is configured to receive a control signal for the multicast group A. The control signal for the multicast group A is transmitted from the base station 10.

The response signal creator 11c is configured to create a response signal to the control signal for the multicast group A.

The holder 11d is configured to hold the created response signal for a predetermined duration; (for example, a random duration).

For example, the holder 11d can determine the random duration based on a number generated by a random number generator, or use a preset duration as the random duration.

For example, the holder 11d of the mobile station 11 can be configured to hold the response signals for 300 ms, the holder lid of the mobile station 12 can be configured to hold the response signals for 500 ms, the holder 11d of the mobile station 21 can be configured to hold the response signals for 900 ms, the holder 11d of the mobile station 41 can be configured to hold the response signals for 200 ms, the holder 11d of the mobile station 42 can be configured to hold the response signals for 800 ms, the holder 11d of the mobile station 43 can be configured to hold the response signals for 500 ms.

The response signal transmitter 11b is configured to transmit the response signal to the base station 10 after holding the response signal for the predetermined duration.

FIG. 5 shows a functional block diagram of the base station used in the radio communication system according to the embodiment. Functions of a plurality of base stations 10 to 40 are basically the same, so that the function of the base station 10 will be explained as follows.

As shown in FIG. 5, the base station 10 is configured with a control signal relay 10a and a response signal relay 10b.

The control signal relay 10a is configured to receive a control signal from the radio network controller 50, and transmit the control signal to the mobile stations 11 and 12 joining in a specific multicast group (for example, the multicast group A) under the base station 10.

The response signal relay 10b is configured to receive a response signal from the mobile stations 11 and 12 under the base station 10, and transmit the response signal to the radio network controller 50 in accordance with a control signal for the multicast group A.

The response signal relay lob can be configured to transfer a predetermined number of response signals (for example, a first response signal) to the radio network controller 50. The predetermined number of response signals are transmitted from the mobile stations 11 and 12.

Any response signal following the predetermined number of response signals (any following response signal) is retained by the response signal relay 10b. In other words, the response signal relay 10b can dump, delete or return the following response signals.

The base stations can determine any number (for example, one, two and so on) as the predetermined number.

FIG. 6 shows a functional block diagram of the radio network controller 50 used in the radio communication system according to the embodiment.

As shown in FIG. 6, the radio network controller 50 is configured with a control signal transmitter 51, a response signal receiver 52 and a response signal processor 53. The base station 10 can support multicast communication.

The control signal transmitter 51 is configured to transmit the control signals for performing predetermined processing such as a service notice processing and an authentication processing to the base stations 10 to 40 in which the mobile stations 11 to 43 performing the predetermined processing exist.

The response signal receiver 52 is configured to receive the response signals transmitted from the mobile stations 11 to 43 via the base stations 10 to 40. The response signal receiver 52 manages the number of response signals received from each mobile station.

The response signal processor 53 is configured to perform a predetermined processing (for example, transmission of service data) in accordance with the response signals received by the response signal receiver 52.

The response signal processor 53 can be configured to perform only the predetermined processing on a predetermined number of response signals (for example, a first response signal) to a control signal for a multicast group. The predetermined number of response signals are transmitted from at least one first mobile station joining in the multicast group A.

Any response signal following the predetermined number of response signals can be unprocessed by the radio network controller 50. The following response signals are transmitted from at least second mobile station joining in the multicast group A.

<An Operation of the Radio Communication System According to the Embodiment>

Referring to FIG. 7, the operation where the radio network controller 50 performs a predetermined processing (for example, a service notice processing, or an authentication processing) on the mobile stations 11, 12, 21, 41, 42, 43 joining in the multicast group A in the radio communication system according to the embodiment will be described.

As shown in FIG. 7, in step 1001, the radio network controller 50 transmits a control signal such as a service notice signal and an authentication signal to three base stations 10, 20 and 40.

In step 1002, each of the base stations 10, 20 and 40 receives the control signal transmitted from the radio network controller 50. The control signals transmitted by each of the base stations 10, 20 and 40 reach the mobile stations 11, 12, 21, 41, 42 and 43 joining in the multicast group A under the base stations 10, 20 and 40.

In step 1003, each of the mobile stations 11, 12, 21, 41, 42 and 43 creates a response signal to the control signal for the multicast group A, and holds the created response signal for a random duration.

In step 1004, each of the mobile stations 11, 12, 21, 41, 42 and 43 transmits the response signal to the base stations 10, 20 and 40 after holding the response signal for the random duration.

In step 1005, each of the base stations 10, 20 and 40 receives the response signal from each of the mobile stations 11, 12, 21, 41, 42 and 43, and transmits the received response signal to the radio network controller 50.

Each of the base stations 10, 20 and 40 may not transfer next signals following a first response signal or a predetermined number of response signals received from the mobile stations 11, 12, 21, 41, 42 and 43, to the radio network controller 50.

In step 1006, the radio network controller 50 transmits a service data to the base stations 10, 20 and 40, in accordance with the response signals received from each of the mobile stations 11, 12, 21, 41, 42 and 43.

The radio network controller 50 can perform a predetermined processing on only a predetermined number of response signals (for example, a first response signal) transmitted from each of the mobile stations 11, 12, 21, 41, 42 and 43.

In other words, any response signal following the predetermined number of response signals is unprocessed by the radio network controller 50. The following response signals are transmitted from the mobile stations 11, 12, 21, 41, 42 and 43 joining in the multicast group A.

The radio network controller 50 can determine any number (for example, one, two and so on) as the predetermined number.

In step 1007, each of base stations 10, 20 and 40 transmits the received service data to each of the mobile stations 11, 12, 21, 41, 42 and 43.

<Functions and Effects of the Radio Communication System According to the Embodiment>

The radio communication system according to the embodiment can reduce the load on the radio network controller 50 caused by response signals which are transmitted from a plurality of mobile stations 11, 12, 21, 41 42 and 43, and which reach the radio network controller 50 at approximately the same time, when common information is transmitted to a plurality of mobile stations like multicast communication or broadcast communication.

The present invention can provide a base station, a mobile station and a radio network controller used in a radio communication system which can reduce the load on the radio network controller during the multicast communication.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A communication system comprising:
    a base station;
    plural mobile stations;
    the plural mobile stations each configured to
        receive a common control signal from the base station,
        hold a response signal for a random duration, the response signal is created in response to the common control signal, and
        transmit the response signal after the random duration; and
    the base station configured to
        receive plural response signals from plural mobile stations included in a multicast group, the number of the plural response signals is at least one,
        receive subsequent response signals from other of the plural mobile stations included in the multicast group,
        transfer only the plural response signals received from the plural mobile stations included in the multicast group, and
        retain the subsequent response signals received from the other of the plural mobile stations included in the multicast group.

2. A method of communicating in a communication system including a base station and plural mobile stations, the method comprising:
    receiving, at a mobile station in the plural mobile stations, a common control signal from the base station;
    creating, at the mobile station, a response signal in response to the common control signal;
    holding the response signal at the mobile station for a random duration;
    transmitting the response signal to the base station after the random duration;
    receiving, at the base station, plural response signals from plural mobile stations included in a multicast group, the number of the plural response signals is at least one;
    receiving subsequent response signals from other of the plural mobile stations included in the multicast group;
    transferring only the plural response signals received from the plural mobile stations included in the multicast group; and
    retaining the subsequent response signals received from the other of the plural mobile stations included in the multicast group.

* * * * *